United States Patent
Tomlinson

[15] 3,707,249
[45] Dec. 26, 1972

[54] DISCHARGE MEANS FOR TANKS OR BINS

[72] Inventor: William H. Tomlinson, Kansas City, Mo.

[73] Assignee: Columbian Steel Tank Company, Kansas City, Mo.

[22] Filed: Sept. 2, 1970

[21] Appl. No.: 69,035

[52] U.S. Cl. ................................................222/464
[51] Int. Cl. ............................................B65g 65/36
[58] Field of Search ...214/17 R, 17 D, 16 R; 193/34; 222/488, 564; 259/280

[56] References Cited

UNITED STATES PATENTS

| | | | |
|---|---|---|---|
| 1,259,583 | 3/1918 | Adams | 214/17 R |
| 3,341,090 | 9/1967 | Reimbert | 222/564 |
| 1,234,709 | 7/1917 | Adams | 214/17 R |
| 407,907 | 7/1889 | Sprague | 259/180 |

Primary Examiner—Robert G. Sheridan
Attorney—Alfred R. Fuchs

[57] ABSTRACT

A vertical row of vertically spaced baffles is provided on the side wall of a receptacle for loose material such as grain, the series of baffles forming a vertical conduit from near the top to adjacent the bottom of the receptacle which has uniformly vertically spaced inlets into it at the upper end of each of the baffles. The baffles are secured to the side wall of the receptacle by either welding or bolting and have flanges for this purpose. The baffles provide conduit sections that have flat walls that incline outwardly in a downward direction so that each baffle forms a gradually widening conduit section. The grain or other loose material is drawn off from the top of the mass downwardly feeding into each of the baffles until the angle of repose of the material is reached, whereupon the material is fed into the next lower baffle, the unloading of the bin or tank thus being in successive layers from the topmost portion of the contents as discharge proceeds.

3 Claims, 4 Drawing Figures

INVENTOR
WILLIAM H. TOMLINSON
BY Alfred R. Fuchs
ATTORNEY

INVENTOR
WILLIAM H. TOMLINSON
BY
Alfred R. Fuchs
ATTORNEY

DISCHARGE MEANS FOR TANKS OR BINS

It is a purpose of my invention to provide a draw-off system for loose material from such receptacles as grain bins or other bins or tanks for loose bulk material, which provides for efficient and safe gravity unloading thereof, by emptying the contents of the receptacle from the top, thus stabilizing downward and outward pressures during the unloading operation.

Sheet metal bins and tanks are ordinarily made up of rings of sheet metal members. Dependent upon the height of such rings, one or more open-ended baffles are provided for each ring of the receptacle, the baffles being in effect short conduit sections, which gradually increase in cross-sectional area from the top to the bottom of each thereof. In order to provide for the drawing off of the loose material, such as grain, for example, in layers beginning at the top of the contents of the receptacle and proceeding with successive downwardly adjacent layers as the receptacle is being emptied, the baffles are vertically spaced from each other so that an entrance is provided for the loose material at the upper end of each of the baffles into which the material will be fed by gravity until the level of the material is such that the material will lie at its angle or repose with the bottom edge of the surface thereof at the top edge of a particular baffle, whereupon the next baffle therebelow will begin to receive the grain or other loose material at the top end thereof.

The baffles are preferably arranged in a vertical row along the side wall of the tank or bin so that each baffle will discharge into the next lower baffle and the series of baffles will form a discharge conduit extending from near the upper end of the receptacle to adjacent the bottom end thereof, where a discharge outlet conduit leads from the lowermost baffle of the series.

Other objects and advantages of my invention will appear as the description of the drawing proceeds. I desire to have it understood, however, that I do not intend to limit myself to the particular details shown or described except as defined in the claims.

Figure 1:
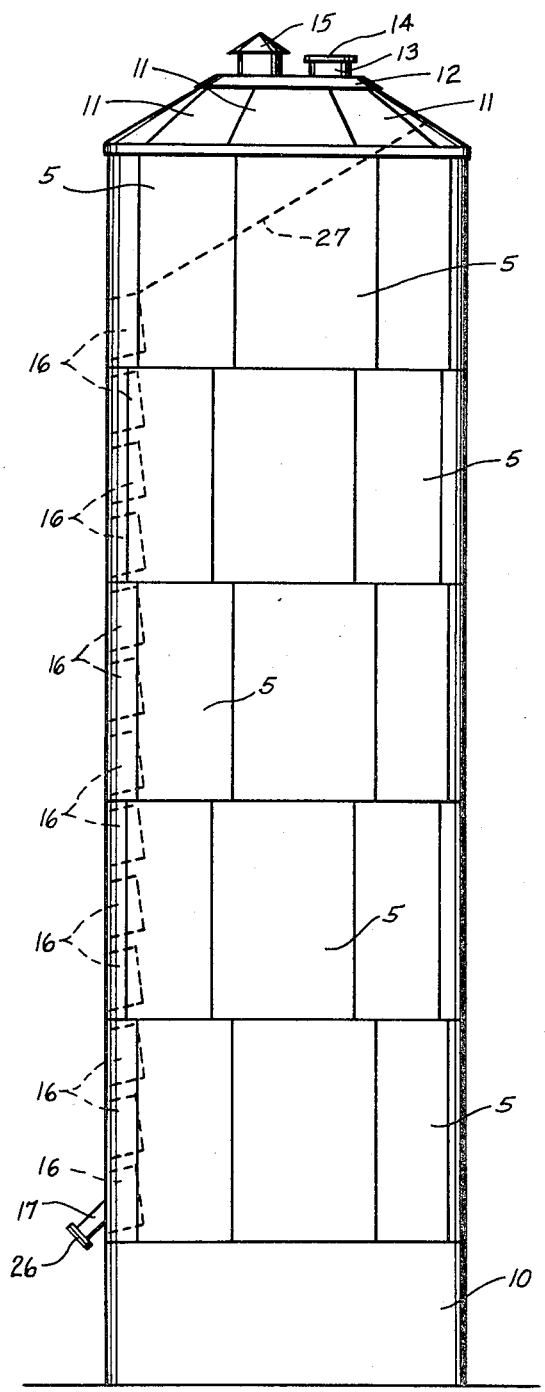
FIG. 1 is a view in elevation of a grain storage bin showing my invention applied thereto.

Referring in detail to the drawings, in FIG. 1 is shown a grain bin which is made up of a plurality of rings of sheet metal sections or panels 5. Said sections or panels can be made of corrugated or plain sheets, as may be found desirable. The sections or panels of each ring are provided with horizontal flanges 6 at the upper and lower ends thereof that are bolted together to connect the vertically adjacent rings with each other, a gasket 8 being provided between the flanges 6. The vertically adjacent edges of the sections of each of the rings are similarly flanged and connected together. The bottommost ring is provided with an angular ring member 9 which is secured to the bottom edges of the sections of the lowermost ring of the bin and serves as a means for mounting the bin on a base or foundation 10. The top of the bin is made up of a plurality of tapering sections 11 which are secured to a central connecting member 12, which is provided with a manhole 13 through which the bin is filled, which manhole is provided with a removable cover 14. A ventilator 15 is also provided on this central member 12.

Mounted on the inner face of the bin are baffle members 16 which are arranged in a vertical row or series extending from a point spaced downwardly from, but near, the top of the bin, to adjacent the bottom thereof. It will be noted that, in the bin shown in FIG. 1, there is only one baffle member 16 provided on one of the sections 5 of the uppermost ring thereof, while the other rings of said sections are shown as being provided with three baffle members. It is to be understood that the number of baffle members provided on each ring would depend upon the height of the sheet metal sections 5 from which the ring is made. A discharge spout 17 extends from the lowermost baffle 16. The baffles 16 are arranged in a vertical row in vertical alignment with each other, as will be obvious from FIGS. 1, 2 and 3.

Each of said baffles has a pair of downwardly diverging side walls 18, a wall 19 extending perpendicularly to the wall 18, and a pair of flanges 20 for attaching the baffles to the vertical wall 21 of the bin. The wall 19 inclines outwardly from the plane of the flanges 20 in a downward direction to diverge downwardly relative to the wall 21. The baffles each have an open top end which provides edge portions 23 on the top end of each baffle that incline downwardly in a direction away from the wall 19, and each of said baffles also has an open bottom end which provides a similarly inclined edge 24 on each of the walls 18. Each of the baffles thus serves as a conduit that gradually increases in cross-sectional area from the top end to the bottom end of the baffle, to provide a downwardly flaring passage therethrough.

Figures 2, 3:
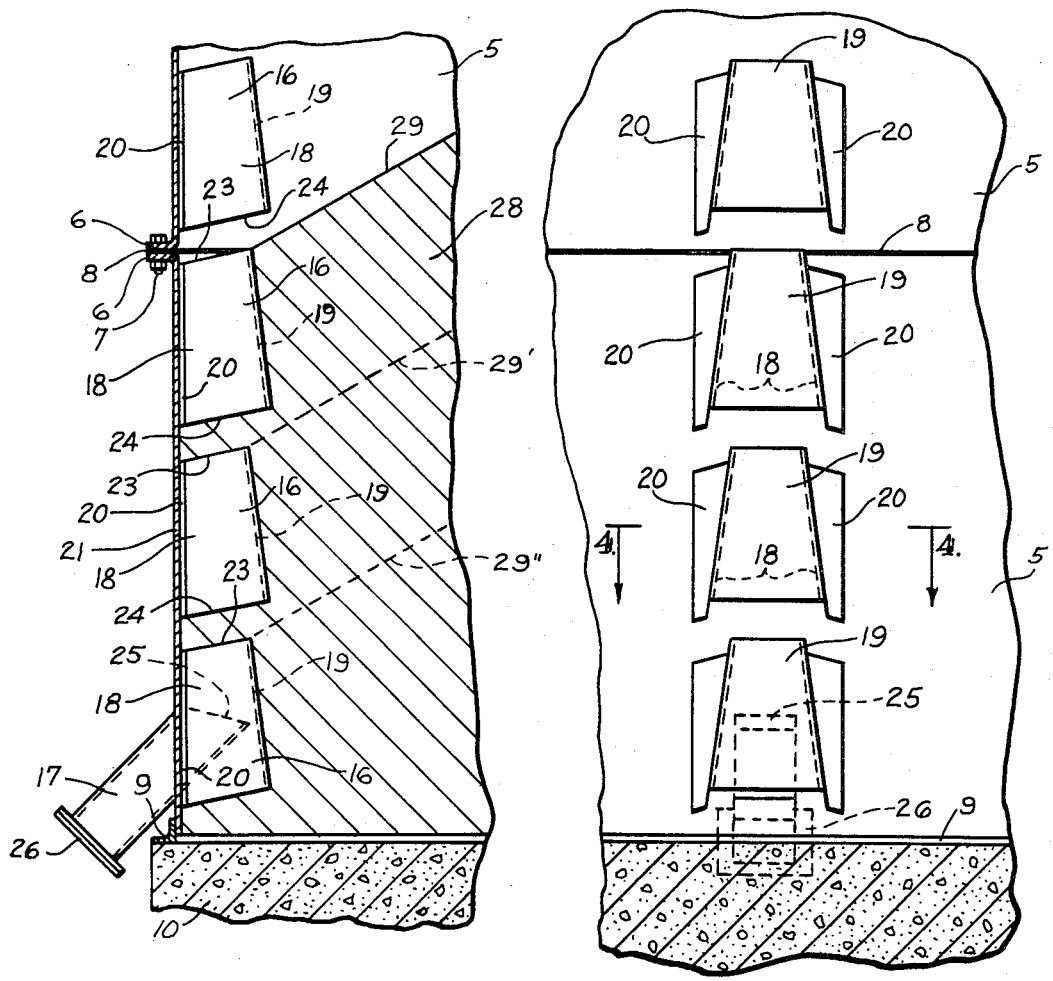
FIG. 2 is a fragmentary vertical sectional view of a portion of the grain bin showing the lower end thereof.
FIG. 3 is an inside face view of the portion of the grain bin shown in FIG. 2.
Figure 4:
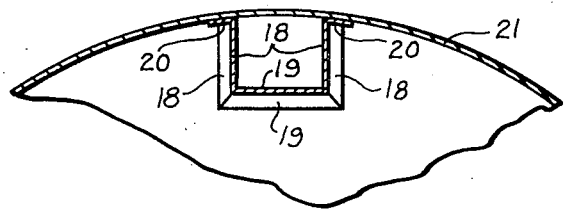
FIG. 4 is a section taken on the line 4—4 of FIG. 3.

Upon reference to FIGS. 1, 2 and 3 it will be noted that the spacing between the bottom open end of each baffle and the top open end of the next lower baffle is the same throughout the vertical series of baffles. The vertical series of baffles thus provide a conduit for the discharge of the material from the bin from near the top thereof to adjacent the bottom thereof with inlets into the conduit at regularly spaced intervals along the same. The discharge spout 17 has an open end 25 located within the passage through the lowermost baffle member 16 and is provided with a closure member 26 at the outer end thereof.

Assuming now that the grain bin or other receptacle for loose material is filled to capacity and withdrawal of the material therefrom is to begin, the closure 26 on the spout 17 is opened and the flow of the material will begin downwardly through the baffle members 16 in succession from the uppermost to the lowermost one thereof. The material will feed into the upper end of the uppermost baffle 16 until the angle of repose of the material stored in the bin is reached, the dotted line 27 in FIG. 1 indicating such an angle of repose for the material being discharged from the bin or receptacle shown in FIG. 1. When the bottommost end of the resulting inclined surface of the material coincides with the top end of the wall 19 of the uppermost baffle member 16 the feeding of the material into this baffle member ceases and the feeding of the material, such as grain, into the next lower baffle member 16, at the upper end thereof, begins.

The flow of the material into the baffle members does not take place through the gaps between the bottom edges and the top edges of adjacent baffle members below the one to which the material is being fed because of the pressure on the material in the remainder of the bin, the sliding of the material crosswise of the bin toward the top end of a baffle member only taking place when the pressure has been relieved sufficiently by removal of the layer of material that was fed into the next higher baffle member. Thus, each layer of the material in the bin that can be said to be bounded by the angle of repose thereof at the bottom of the layer is fed into the conduit, made up of the series of baffle members, when said layer is the topmost layer of the material in the bin and the layers of said material will be successively fed into the conduit made up of the baffles or conduit sections 16 in a downward direction.

In FIG. 2 the top surface of the material, which is indicated by the numeral 28, is indicated at 29, and the baffle member 16, which is shown with the top edge of its wall 19 aligned with the bottom edge of the top surface 29 of said material, has ceased feeding the material downwardly into the next succeeding baffle member and from that into the lowermost baffle member and out through the discharge spout 17. Said material will now be fed into the next lower baffle member 16 until the top edge 29' of said material is reached. Then the discharge will occur into the top of the bottommost baffle member 16 until the top surface 29'' of the material 28 is reached, the action being substantially the same as described in connection with the three lowermost baffle members throughout the rest of the baffle members or conduit sections that form the discharge conduit of the bin. By withdrawing the material from the bin in layers, beginning with the topmost layer and then in turn each succeeding layer, pressures on the bin wall are stabilized.

What I claim is:

1. In a storage receptacle having an upstanding wall, and a plurality of vertically spaced, vertically elongated, upstanding baffles adjacent said wall, said baffles each having a pair of side walls extending from the inner face of said upstanding wall, and a wall extending between said side walls in spaced relation to said upstanding wall.

2. In a storage receptacle having an upstanding wall, a plurality of vertically spaced, vertically elongated, upstanding baffles adjacent said wall, and means for mounting said baffles on the inner face of said wall in a vertical row in vertical alignment with each other.

3. In the storage receptacle claimed in 1 in which said baffles are vertically aligned and said side walls of each baffle are flat and diverge downwardly and said wall extending between said side walls is flat and diverges downwardly relative to the upstanding wall of said receptacle to provide a short vertical downwardly flaring passage through said baffle.

* * * * *